United States Patent [19]

Nogami et al.

[11] Patent Number: 4,940,111
[45] Date of Patent: Jul. 10, 1990

[54] MOTORCYCLE

[75] Inventors: Yoshio Nogami, Okayama; Yoshihiro Matsuo, Saitama; Takayuki Fujii, Saitama; Seiichi Urashi, Saitama, all of Japan

[73] Assignee: Honda Giken Kogyo Kabushiki Kaisha, Tokyo, Japan

[21] Appl. No.: 220,602

[22] Filed: Jul. 18, 1988

[30] Foreign Application Priority Data

Jul. 17, 1987 [JP] Japan .................. 62-177172
Jul. 20, 1987 [JP] Japan .................. 62-180642

[51] Int. Cl.⁵ .................................. B62B 61/02
[52] U.S. Cl. ........................ 180/219; 280/202; 280/288.4
[58] Field of Search ............... 180/218, 219, 227; 280/202, 274, 275, 276, 279, 281 R, 202, 288.4; 224/42.42 R, 42.11, 275, 31

[56] References Cited

U.S. PATENT DOCUMENTS 4,577,719  3/1986  Nomura et al. .............. 180/219
4,700,799 10/1987  Kawano ...................... 180/219
4,723,620  2/1988  Ono .......................... 180/219

FOREIGN PATENT DOCUMENTS 0255254  2/1988  European Pat. Off. .
3047985 12/1980  Fed. Rep. of Germany .
  23973  2/1979  France .
2599702 12/1987  France .
2604967  4/1988  France .
59-192481 12/1984  Japan .

Primary Examiner—Charles A. Marmor
Assistant Examiner—Richard Camby
Attorney, Agent, or Firm—Irving M. Weiner; Joseph P. Carrier; Pamela S. Burt

[57] ABSTRACT

A motorcycle has a head pipe, a pair of laterally spaced main frames extending rearwardly from the head pipe, and a receptacle supported on the main frames. In order to effectively utilize a space between the main frames, the receptacle has a bottom wall positioned between the main frames, the bottom wall having at least a portion positioned below a plane including an upper surface of the main frames.

22 Claims, 3 Drawing Sheets

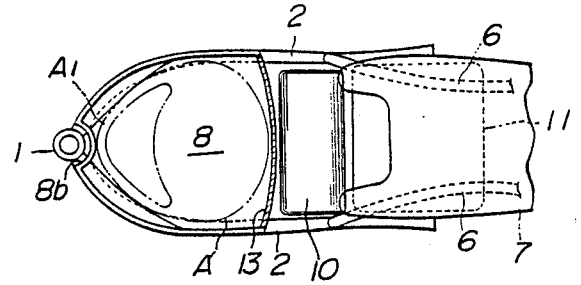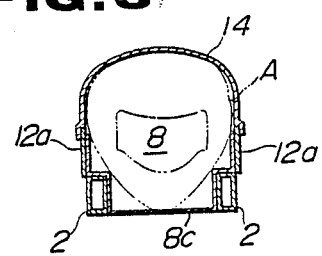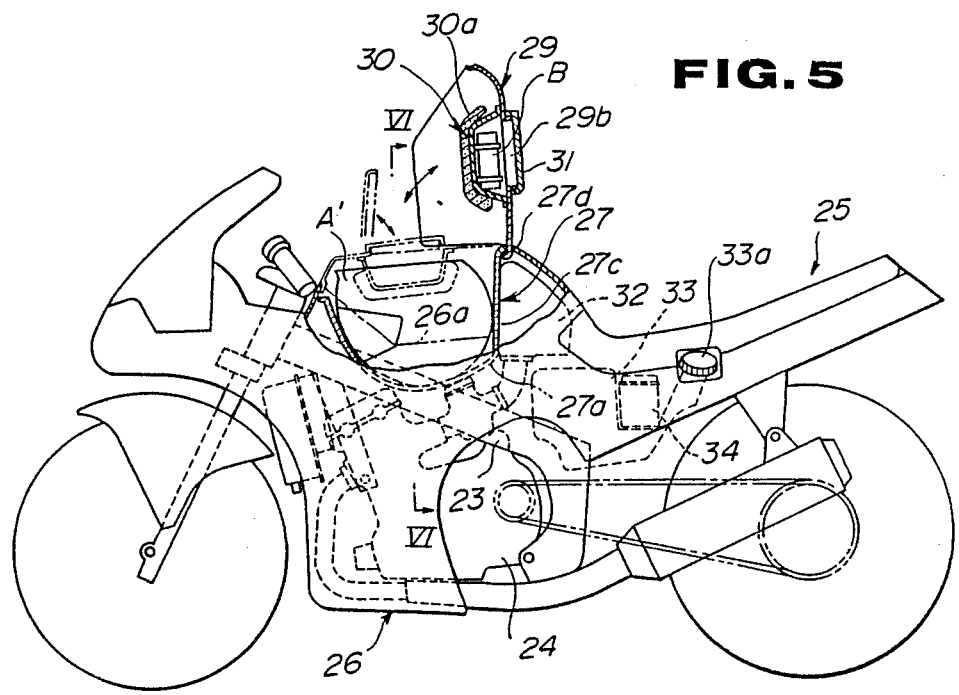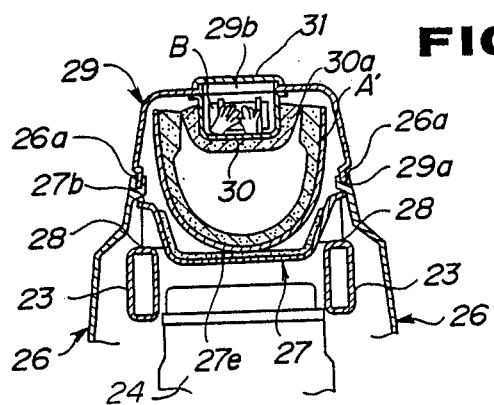

MOTORCYCLE

BACKGROUND OF THE INVENTION

1. Field of the Invention:

The present invention relates to a motorcycle, and more particularly to a motorcycle having a receptacle for storing a crash helmet.

2. Description of the Relevant Art:

Japanese Laid-Open Utility Model Publication No. 59-192481 discloses a motorcycle having a crash helmet receptacle disposed on a pair of laterally spaced main frames extending rearwardly from a head pipe. A full-face crash helmet can be placed into and taken out of the receptacle by opening an upper lid of the receptacle. To ensure that the upper end level of the receptacle is positioned within a prescribed height range, the main frames are supported on a subframe extending rearwardly from the head pipe and are inclined downwardly in the rearward direction at a relatively large angle. The receptacle with its rear portion made deeper is mounted on the main frames. The crash helmet as it faces back is stored in the receptacle.

The crash helmet receptacle has its bottom wall placed on the main frames. Because of limitations impose by the frames on the configuration of the bottom wall of the receptacle, the crash helmet stored in the receptacle is positioned a certain distance upwardly of the main frames, and there is a dead space below the stored crash helmet between the main frames. Since the motorcycle has a limited space available thereon, such a dead space should be minimized as much as possible.

SUMMARY OF THE INVENTION

According to the present invention, there is provided a motorcycle comprising a head pipe, a pair of laterally spaced main frames extending rearwardly from the head pipe, and a receptacle supported on the main frames, the receptacle having a bottom wall positioned between the main frames, the bottom wall having at least a portion positioned below a plane including an upper surface of the main frames.

With the above arrangement, the motorcycle's available space relative to its frame is effectively utilized, and a large size receptacle is provided for storing a crash helmet and other items.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2 is a plan view taken along line II—II of FIG. 1, with a cover and the like being omitted from illustration;

FIG. 3 is a cross-sectional view taken along line III—III of FIG. 1;

FIG. 5 is a schematic side elevational view, partly in cross section, of a motorcycle according to a second embodiment of the present invention;

FIG. 6 is a cross-sectional view taken along line VI—VI of FIG. 5;

DETAILED DESCRIPTION OF THE PREFERRED EMBODIMENT

Figure 1:
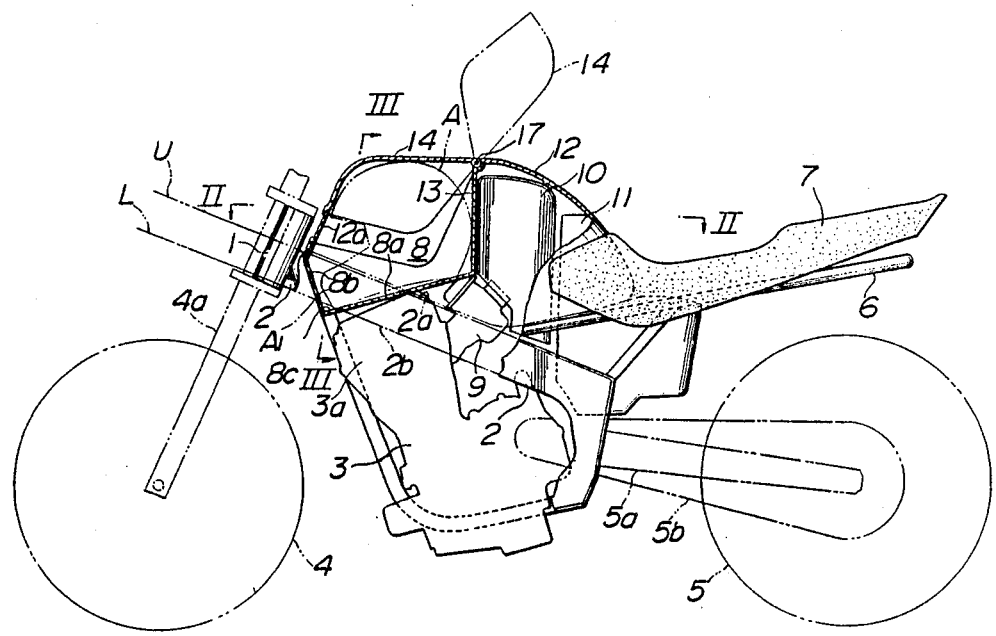
FIG. 1 is a schematic side elevational view, partly in cross section, of a motorcycle according to a first embodiment of the present invention.

As shown in FIGS. 1 and 2, a motorcycle has a frame including a pair of laterally spaced main frames 2 extending rearwardly from a head pipe 1. An engine 3 is disposed in a space below the main frames 2. As best shown in FIG. 3 each of the main frames 2 has a substantially rectangular cross section with a width dimension smaller than a height dimension. A front wheel 4 is rotatably supported on the head pipe 1 by means of a front fork 4a. A rear wheel 5 is rotatably supported on a lower portion of the rear end of the main frames 2 by means of a rear fork 5a, the rear wheel 5 being driven by the engine 3 through a chain 5b. A rider's seat or saddle 7 is mounted on a pair of laterally spaced seat rails 6 at a rear portion of the motorcycle frame.

A crash helmet receptacle 8 is so shaped as to allow a full-face crash helmet A to be stored therein with its face directed forwardly. The receptacle 8 has a flat bottom wall 8a including a front end portion 8c for placing thereon a jaw cover $A_1$ of the crash helmet A. As shown in FIGS. 2 and 3, the receptacle 8 has a pair of laterally spaced sidewalls which extend substantially vertically, while the front end portion 8c is of a reduced width relative to the vertically extending sidewalls and complementary to the shape of the jaw cover $A_1$, the bottom wall 8a being progressively wider in the rearward direction. As will be understood from FIGS. 1–3, the reduced width of the front portion 8c and its shape complementary to the jaw cover $A_1$ functions to prevent the helmet A from moving within the receptacle 8. The receptacle 8 is inserted in a gap or space between confronting front portions of the main frames 2 near their front ends. The receptacle 8 is disposed on the front half portions of the main frames 2 with the bottom wall 8a being inclined upwardly in the rearward direction.

As is clear from FIG. 1, the receptacle 8 has a front wall 8b with its upper portion disposed in confronting relation to the head pipe 1. The front end portion 8c of the bottom wall 8a is positioned below a plane U including the upper surface 2a of the main frames 2 and near a plane L including the lower surface 2b of the main frames 2.

The engine 3 comprises a vertical-type engine having a cylinder head 3a positioned just beneath the front end portion 8c of the bottom wall 8a of the receptacle 8, and inserted in a gap or space between confronting intermediate portions of the main frames 2. A carburetor 9 is positioned in a space above the main frames 2 and below the rear end of the receptacle 8. An air cleaner case 10 is disposed behind and adjacent to the receptacle 8, and a fuel tank 11 is located behind the air cleaner case 10. The receptacle 8, the air cleaner case 10, and the fuel tank 11 are covered with a cover member 12 which has a substantially unitary outer configuration. The portion of the cover member 12 which covers the receptacle 8 defines an upper wall of the receptacle 8 and serves as a lid 14. The engine 3 is located directly below the receptacle 8 and the air cleaner case 10 which are covered with the cover member 12. If the receptacle 8 were reversed with its front moved back, its portion for storing the jaw cover $A_1$ of the crash helmet A would be in physical interference with the carburetor 9, and the above layout could not be adopted.

In the illustrated embodiment, an upstanding partition 13 is disposed at the rear end of the receptacle 8 for separating the receptacle 8 from the air cleaner case 10. The lid 14 is of the front-open-type and is hinged to the upper end of the partition 13 by a transverse pin 17 for covering the receptacle 8. The crash helmet A can be placed into and taken out of the receptacle 8 by opening the lid 14. The cover 12 has an extension 12a extending in surrounding relation to the receptacle 8. The lid 14 has a lower peripheral edge that can be fitted over the upper edge of the extension 12a.

Figure 4:
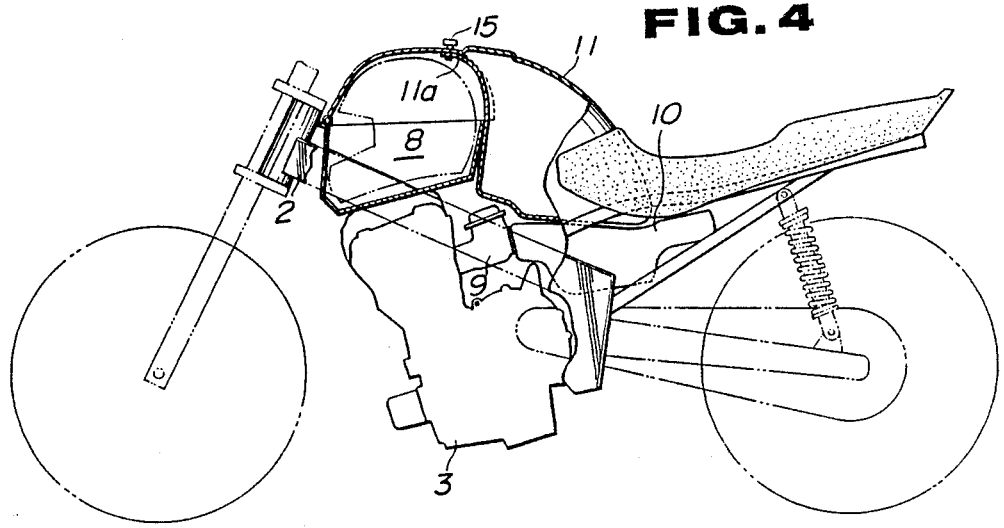
FIG. 4 is a schematic side elevational view, partly in cross section, of a motorcycle according to a modification of the first embodiment.

The layout of the engine accessories is not limited to the above embodiment. As shown in FIG. 4, a fuel tank 11 may be disposed behind the receptacle 8, and an air cleaner case 10 may be disposed below the fuel tank 11 whereas a carburetor 9 may be disposed in a gap between confronting portions of the main frames 2 in front of the air cleaner case 10. The engine 3 is also not limited to the vertical-type engine, but may be of the horizontal- or V-type.

In the embodiment of FIG. 4, a lid of the receptacle 8 is of the rear-open type, and has a rear end that can be fastened to a flange 11a on the front end of the fuel tank 11 by means of a key lock member 15.

With the first embodiment of the present invention, as described above, the crash helmet receptacle is disposed as closely to the front ends of the main frames as possible with a good space factor. The gap between the main frames which extends from their intermediate portions to their rear ends, and the space above that gap can be employed as an installation space for the cylinder head of the engine and the accessories thereof. Therefore, the degree of design freedom is increased with respect to the layout of the engine and the accessories.

FIG. 5 and 6 shows a motorcycle according to a second embodiment of the present invention. In FIG. 5, an engine 24 is disposed below a pair of laterally spaced main frames 23, and seat frames (not shown) extend from the rear ends of the main frames, with a rider's seat or saddle 25 mounted on the seat frame. Opposite sides, a front side, and a portion of an upper side of the motorcycle frame are covered with a cover 26.

A large receptacle 27 for storing a crash helmet has an arcuate bottom wall 27a shaped complementarily to an outer shape of the crash helmet to be stored. As shown in FIG. 6, the receptacle 27 is fixed to the main frames 23 by suitable fastening means 28 with the opening of the receptacle 27 being directed rearwardly upwardly. The receptacle 27 has side walls 27b lower than upper edges 26a of the cover 26 and held in contact with inner surfaces of the cover 26. The receptacle 27 also has a rear wall 27c extending upwardly with a hinge 27d mounted on the upper end thereof.

A lid 29 in the form of a downwardly opening channel is pivotally coupled to the hinge 27d and has laterally spaced lower edges 29a which can be fitted respectively in grooves defined in the upper edges 26a of the cover 26. The lid 29 has a central opening 29b defined therein, and a smaller receptacle 30 is fixed to the lower surface or reverse side of the lid 29 in registry with the opening 29b. A smaller lid 31 is hinged to the lid 29 for opening and closing the opening 29b.

Cushioning sponge layers 27e, 30a are attached to the inner surface of the large receptacle 27 and the outer surface of the smaller receptacle 30, respectively, for holding a crash helmet A' in a damped manner against unwanted wobbling movement. The lids 29, 31 can be locked against accidental opening. Denoted at 32 is an air cleaner, 33 a fuel tank, 33a a cap, and 34 a battery.

Figure 7:
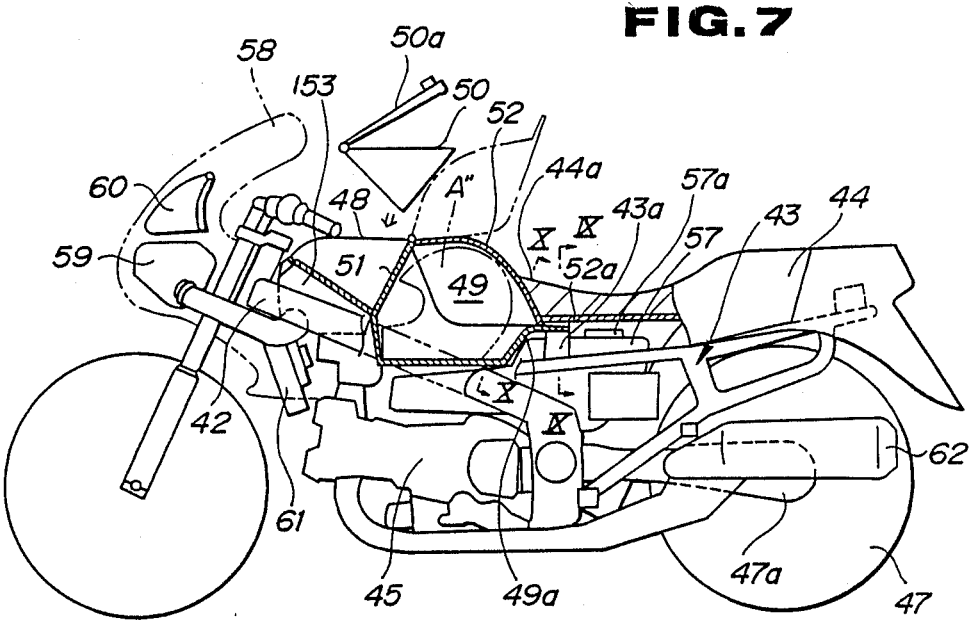
FIG. 7 is a schematic side elevational view, partly in cross section, of a motorcycle according to a third embodiment of the present invention.
Figure 8:
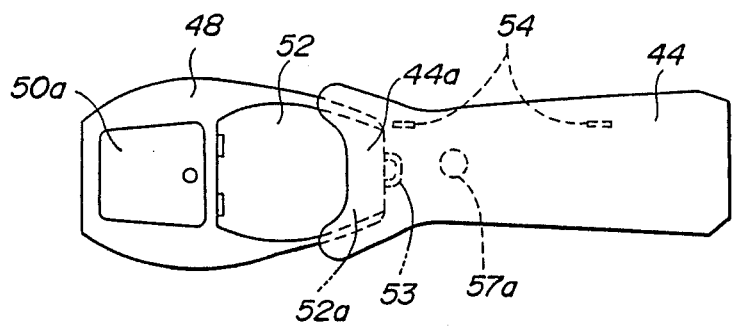
FIG. 8 is a schematic plan view of a portion of the motorcycle shown in FIG. 7.

The crash helmet A' is stored in the large receptacle 27, and various small articles B such as gloves are stored in the smaller receptacle 30. Thus, the crash helmet A' and small articles B can be stored separately from each other. Since the smaller receptacle 30 is positioned in the crash helmet A' stored in the large receptacle 27 when the lid 29 is closed, the space in the large receptacle 27 is effectively utilized FIGS. 7 through 10 illustrate a motorcycle according to a third embodiment of the present invention. As shown in FIG. 7, a cover 48 shaped like a normal fuel tank (FIG. 8) is mounted on a pair of laterally spaced main frames 42. A crash helmet receptacle 49 for storing a crash helmet A" is disposed in the cover 48 adjacent to a front side of a rider's seat or saddle 44. An article receptacle 50 with an upper lid 50a is detachably disposed in a front portion of the cover 48. A portion of the cover 48 which is positioned above the receptacle 49 is employed as a lid 52 pivotally supported on an upper end of a partition 51 disposed vertically at the front end of the receptacle 49. The crash helmet A" can be taken into and out of the receptacle 49 by opening the lid 52.

The receptacle 49 has a rear end extension 49a extending rearwardly in underlapping relation to a front end portion 44a of the seat 44. The rear end extension 49a is fixed to a cross member 43a of seat rails 43, and the lid 52 has a rear end 52a (FIG. 8) positioned below the front end portion 44a of the seat 44, with a grip 53 on the rear end 52a of the lid 52 being seated on the cross member 43a.

Figure 10:
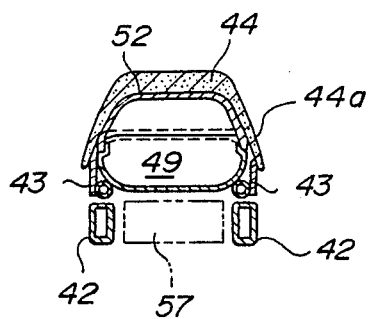
FIG. 10 is a cross-sectional view taken along line X—X of FIG. 7.

Even if the partition 51 is inclined rearwardly to increase the storage space in the article receptacle 50, the opening of the receptacle 49 remains large because of the rear end extension 49a. Therefore, the crash helmet A" can easily be stored into and removed out of the receptacle 49 by opening the lid 52. While the motorcycle is running, the lid 52 is held down by knee-gripping forces applied by the rider to the front end 44a of the seat 44, so that the lid 52 is prevented from wobbling (FIG. 10).

In the embodiment shown in FIG. 7, an air cleaner case 153 is disposed underneath the article receptacle 50 in order to effectively utilize a space in front of the crash helmet receptacle 49.

Figure 9:
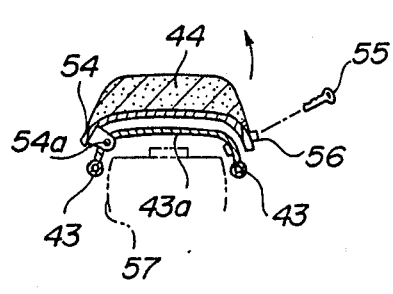
FIG. 9 is a cross-sectional view taken along line IX—IX of FIG. 7.

As shown in FIG. 9, the seat 44 is laterally pivotally coupled to one end of the cross member 43a by a hinge 54 having a shaft 54a extending in the longitudinal direction of the motorcycle. By lifting the seat 44 about the shaft 54a, the lid 52 is released and can be opened. When the seat 44 is turned downwardly, the side of the seat 44 remote from the hinge 54 is locked on the cross member 43a by a lock 56 which is operated by a key 55. With the seat 44 placed downwardly and locked by the lock 56, the lid 52 is locked against opening and hence the stored crash helmet A" is prevented from being stolen.

An engine 45 is of the horizontal type and is disposed below the receptacle 49 with a gap being left therebetween. A fuel tank 57 extends from the gap into a space beneath the seat 44. The fuel tank 57 has a fuel inlet port 57a on its upper rear surface, so that the seat 44 doubles as a cover for protecting the fuel inlet port 57a against vandalism.

Denoted at 58 is a fairing, 59 an auxiliary air cleaner case disposed in the fairing 58, 60 an instrument assembly, 61 a radiator, and 62 a muffler.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motorcycle comprising:
   a head pipe;
   a pair of laterally spaced main frames extending rearwardly from said head pipe;
   a receptacle supported on said main frames;
   said receptacle having a bottom wall positioned between said main frames, said bottom wall having at least a portion positioned below a plane including an upper surface of said main frames; and
   said receptacle being shaped for storing a crash helmet therein.

2. A motorcycle according to claim 1, wherein said bottom wall is substantially flat and has a front portion positioned below said plane.

3. A motorcycle according to claim 2, wherein said front portion of the bottom wall is positioned near said plane.

4. A motorcycle according to claim 2, wherein said bottom wall has a rear portion which is wider than said front portion.

5. A motorcycle according to claim 1, wherein said receptacle is shaped for storing a crash helmet with a front face thereof directed forwardly.

6. A motorcycle according to claim 1, wherein said receptacle has a lid defining an upper wall thereof for opening and closing the receptacle, said lid being angularly movable about an axis extending transversely of the motorcycle.

7. A motorcycle comprising:
   a head pipe;
   a pair of laterally spaced main frames extending rearwardly from said head pipe;
   a receptacle supported on said main frames;
   said receptacle having a bottom wall positioned between said main frames, said bottom wall having at least a portion positioned below a plane including an upper surface of said main frames;
   said receptacle having a lid defining an upper wall thereof for opening and closing the receptacle, said lid being angularly movable about an axis extending transversely of the motorcycle; and
   said lid having a smaller receptacle on its reverse side, said smaller receptacle being positionable in an opening of a crash helmet when said crash helmet is stored in said receptacle with the opening of the crash helmet being directed upwardly and said lid being closed.

8. A motorcycle comprising:
   a head pipe;
   a pair of laterally spaced main frames extending rearwardly from said head pipe;
   a receptacle supported on said main frames;
   said receptacle having a bottom wall positioned between said main frames, said bottom wall having at least a portion positioned below a plane including an upper surface of said main frames; and
   said receptacle having a lid defining an upper wall thereof for opening and closing the receptacle, said lid being angularly movable about an axis extending transversely of the motorcycle; and
   an air cleaner case disposed behind and adjacent to said receptacle, and a cover having a substantially single outer configuration and covering said receptacle and said air cleaner case, said lid being a portion of said cover.

9. A motorcycle according to claim 8, further comprising a fuel tank disposed behind and adjacent to said air cleaner case, said fuel tank having a portion positioned inside of said cover.

10. A motorcycle comprising:
    a head pipe;
    a pair of laterally spaced main frames extending rearwardly from said head pipe;
    a receptacle supported on said main frames;
    said receptacle having a bottom wall positioned between said main frames, said bottom wall having at least a portion positioned below a plane including an upper surface of said main frames;
    said receptacle having a lid defining an upper wall thereof for opening and closing the receptacle, said lid being angularly movable about an axis extending transversely of the motorcycle; and
    a rider's seat disposed behind and adjacent to said receptacle, said rider's seat having a front portion disposed in overlapping relation to a rear portion of said receptacle, said lid having a pivotally supported front end and a rear end positionable below said front portion of said rider's seat.

11. A motorcycle according to claim 10, wherein said rider's seat is pivotally supported on a frame of the motorcycle for angular movement about an axis extending longitudinally of the motorcycle.

12. A motorcycle according to claim 10, further comprising a smaller receptacle and an air cleaner case which are vertically arranged in front of and adjacent to said receptacle.

13. A motorcycle according to claim 12, wherein said smaller receptacle is detachably mounted on a frame of the motorcycle.

14. A motorcycle according to claim 1, wherein said upper surface of said main frames extends substantially parallel to a longitudinal axis of said main frames.

15. A motorcycle according to claim 1, wherein said storage receptacle is adapted to store a crash helmet with a lower opening of the helmet positioned substantially flush with said bottom wall of the storage receptacle.

16. A motorcycle according to claim 1, wherein said receptacle is shaped for storing a full face crash helmet with a front face thereof directed forwardly.

17. A motorcycle according to claim 1, further including:
    an engine; and
    said bottom wall of said storage receptacle is positioned adjacent an upper end of said engine.

18. A motorcycle according to claim 1, wherein:
said bottom wall of said storage receptacle is arcuately shaped complimentarily to an outer shape of a crash helmet to be stored in said storage receptacle.

19. A motorcycle according to claim 1, wherein said storage receptacle has cushioning means provided on an inner surface thereof for holding a crash helmet in a damped manner.

20. A motorcycle according to claim 1, wherein each of said pair of laterally spaced main frames has a substantially rectangular cross section with a width dimension thereof smaller than a height dimension thereof.

21. A motorcycle according to claim 1, wherein said receptacle includes means for preventing a crash helmet as stored therein from being moved about.

22. A motorcycle according to claim 21, wherein said receptacle includes a pair of laterally spaced sidewalls extending substantially vertically a width of the bottom wall of said receptacle being smaller than a distance between said vertically extending sidewalls at said portion of the bottom wall below said plane; and said means for preventing helmet movements comprises said small width portion of said bottom wall.

* * * * *

UNITED STATES PATENT AND TRADEMARK OFFICE
CERTIFICATE OF CORRECTION

PATENT NO. : 4,940,111

DATED : July 10, 1990

INVENTOR(S) : Nogami et al.

It is certified that error appears in the above-identified patent and that said Letters Patent is hereby corrected as shown below:

Column 4, line 18, after "utilized" insert a period.

Column 6, line 9 (Claim 8, line 9), delete "and".

Signed and Sealed this

Twelfth Day of May, 1992

Attest:

DOUGLAS B. COMER

*Attesting Officer*  *Acting Commissioner of Patents and Trademarks*